US008948103B2

(12) United States Patent
Aguirre et al.

(10) Patent No.: US 8,948,103 B2
(45) Date of Patent: Feb. 3, 2015

(54) USING USER DEVICE FEED BACK TO DYNAMICALLY ALLOCATE NETWORK RESOURCES FOR PROVISIONING SERVICES

(75) Inventors: Sergio Aguirre, Southlake, TX (US); Derek Hongwei H. Bao, Concord, CA (US); Lalit R. Kotecha, San Ramon, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 479 days.

(21) Appl. No.: 13/211,868

(22) Filed: Aug. 17, 2011

(65) Prior Publication Data
US 2013/0044694 A1 Feb. 21, 2013

(51) Int. Cl.
*H04W 28/16* (2009.01)
*H04W 4/00* (2009.01)
*H04W 88/18* (2009.01)

(52) U.S. Cl.
CPC .............. *H04W 28/16* (2013.01); *H04W 4/00* (2013.01); *H04W 88/18* (2013.01)
USPC ............ 370/329; 370/390; 370/310; 370/312

(58) Field of Classification Search
USPC ........................................................ 370/329
See application file for complete search history.

(56) References Cited

U.S. PATENT DOCUMENTS

| 6,842,621 | B2* | 1/2005 | Labun et al. ............... 455/456.3 |
|---|---|---|---|
| 7,502,341 | B2* | 3/2009 | Matoba et al. ................. 370/319 |
| 8,023,957 | B2* | 9/2011 | Weigand .................... 455/452.1 |
| 8,045,557 | B1* | 10/2011 | Sun et al. ....................... 370/390 |
| 8,413,201 | B2* | 4/2013 | Chun ............................. 725/109 |
| 8,442,556 | B2* | 5/2013 | Rawat et al. ............... 455/456.2 |
| 2006/0234678 | A1* | 10/2006 | Juitt et al. ...................... 455/411 |
| 2007/0133484 | A1* | 6/2007 | Albal et al. .................... 370/338 |
| 2008/0040757 | A1* | 2/2008 | Romano et al. ................. 725/81 |
| 2009/0225738 | A1* | 9/2009 | Xu et al. ........................ 370/343 |
| 2010/0080176 | A1* | 4/2010 | Maas et al. ..................... 370/329 |
| 2011/0059691 | A1* | 3/2011 | Hegge ........................... 455/11.1 |
| 2012/0008546 | A1* | 1/2012 | Yokoyama et al. ........... 370/315 |
| 2012/0064918 | A1* | 3/2012 | Nakayasu ................. 455/456.1 |
| 2012/0108246 | A1* | 5/2012 | Monogioudis ................ 455/446 |

(Continued)

OTHER PUBLICATIONS

3GPP Organizational Partners, "$3^{rd}$ Generation Partnership Project, Technical Specification Group Services and System Aspects, Multimedia Broadcast/Multicast Service (MBMS), Architecture and functional description (Release 9)", 3GPP TS 23.246, V9.5.0 (Jun. 2010), 65 pages.

*Primary Examiner* — Ian N Moore
*Assistant Examiner* — Lakeram Jangbahadur

(57) ABSTRACT

A system may receive, from one or more user devices, service information that identifies applications that are being accessed by the user devices and levels of service quality, received by the user devices, when accessing the applications; identify, based on the service information, that a user device is accessing an application at a level of service quality that is less than a threshold; assign, one or more quantities of bandwidth, to the applications, based on the service information; and transmitting, to the base station, scheduling information that identifies how the quantities of bandwidth are assigned to the applications, where transmitting the scheduling information allows the base station to use a quantity of bandwidth, assigned to the application, to provide the application to the user device at a level of service quality that is not less than the threshold.

22 Claims, 7 Drawing Sheets

(56) References Cited

U.S. PATENT DOCUMENTS

| | | | |
|---|---|---|---|
| 2012/0129517 A1* | 5/2012 | Fox et al. | 455/425 |
| 2012/0134275 A1* | 5/2012 | Choi et al. | 370/241 |
| 2012/0214525 A1* | 8/2012 | Fujii et al. | 455/502 |
| 2012/0218968 A1* | 8/2012 | Kim et al. | 370/329 |
| 2013/0051331 A1* | 2/2013 | Bao et al. | 370/329 |

* cited by examiner

| USER DEVICE ID 405 | SERVICE ID 410 | SERVICE TYPE 415 | FREQUENCY BAND 420 | BASE STATION ID 425 | TIME 430 | SIGNAL QUALITY 435 | SERVICE QUALITY 440 |
|---|---|---|---|---|---|---|---|
| MDN1 | APN1 | MT | BAND 1 | 120-1 | time1 | signal1 | service1 |
| MDN2 | APN1 | MT | BAND 2 | 120-1 | time2 | signal2 | service2 |
| MDN3 | SERVICE1 | UT | BAND 1 | 120-2 | time3 | signal3 | service3 |
| MDN4 | APPLICATION1 | BT | BAND 3 | 120-3 | time4 | signal4 | service4 |

| SCHEDULE ID 605 | | TIME 610 | BASE STATION ID 615 |
|---|---|---|---|
| SERVICE ID 620 | SERVICE TYPE 625 | FREQUENCY BAND 630 | BANDWIDTH 635 |
| APN1 | MT | BAND 1 | BW1 |
| APN1 | MT | BAND 2 | DR2 |
| APPLICATION1 | UT | BAND 3 | SF3 |
| SERVICE1 | BT | BAND 4 & 5 | MCS4 |
| ... | ... | ... | ... |

FIG. 6

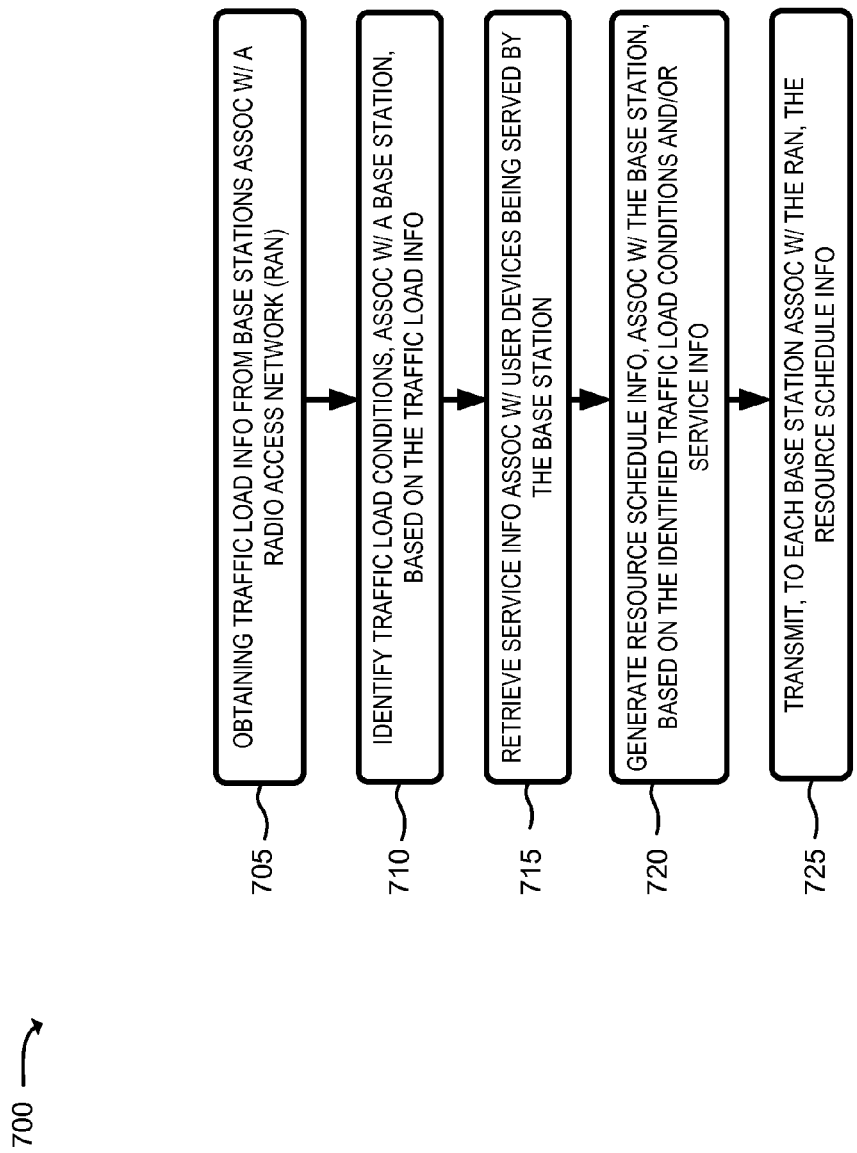

USING USER DEVICE FEED BACK TO DYNAMICALLY ALLOCATE NETWORK RESOURCES FOR PROVISIONING SERVICES

BACKGROUND

A user device may communicate with a network via a base station that processes traffic traveling between the user device and the network. The user device may communicate with the network while moving between cells associated with different base stations. User devices may communicate via the base stations to receive services, from the network, via unicast, multicast, and/or broadcast communications. The unicast, multicast, and/or broadcast communications may be received on different frequencies and/or channels.

Unfortunately, when the number of user devices accessing a service, that is being provisioned by the network via the base stations, increases to a level that is greater than a threshold, the network and/or the base stations may become congested. The network and/or base stations may also become congested when a quantity of bandwidth, that is used to provision the services, is greater than a bandwidth capacity of the network and/or base stations.

BRIEF DESCRIPTION OF THE DRAWINGS

FIG. 4 is a diagram of an example data structure that stores service information that identifies a level of signal quality and/or service quality associated with an application and/or service being accessed by a user device;

FIG. 6 is a diagram of an example data structure that stores resource scheduling information associated with a base station; and FIG. 7 is a flow chart of an example process for generating resource scheduling information, associated with a base station, according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable a network to obtain, from one or more user devices, service information associated with the user devices. The systems and/or methods may allow the service information to be processed to identify conditions associated with applications and/or services (e.g., unicast services, multicast services, etc.) being received by the user devices.

The service information may identify which applications and/or services are accessed by the user devices, levels of service quality received by the user devices, and/or radio conditions present while communicating with the user devices via a radio access network (RAN). A level of service quality, received by a user device, may correspond to how often a service and/or application is available to be used, by the user device, relative to a period of time associated with a session to access the service and/or application. The radio conditions may correspond to signal strength, signal noise, frequency band, etc. used by the user device to communicate with the RAN.

The systems and/or methods may enable traffic conditions, within the RAN, to be identified. Information associated with the traffic conditions may identify applications and/or services that are being provided by the RAN, frequency bands and/or bandwidth being used by the RAN, whether congestion is present within the RAN, etc.

The systems and/or methods may enable the network to perform load balancing, within the RAN, by allocating network resources (e.g., carrier bands, available bandwidth, base station capacity, etc.), in a manner that reduces and/or eliminates congestion within the RAN. The systems and/or methods may also enable the network to allocate the network resources to ensure that the user devices receive a level of signal quality and/or a level of service quality to which the user devices have subscribed. The systems and/or methods may generate resource scheduling information which identifies a manner in which the network resources have been allocated and/or are to be used, by the RAN, to provision the applications and/or services to the user devices.

Figure 1:
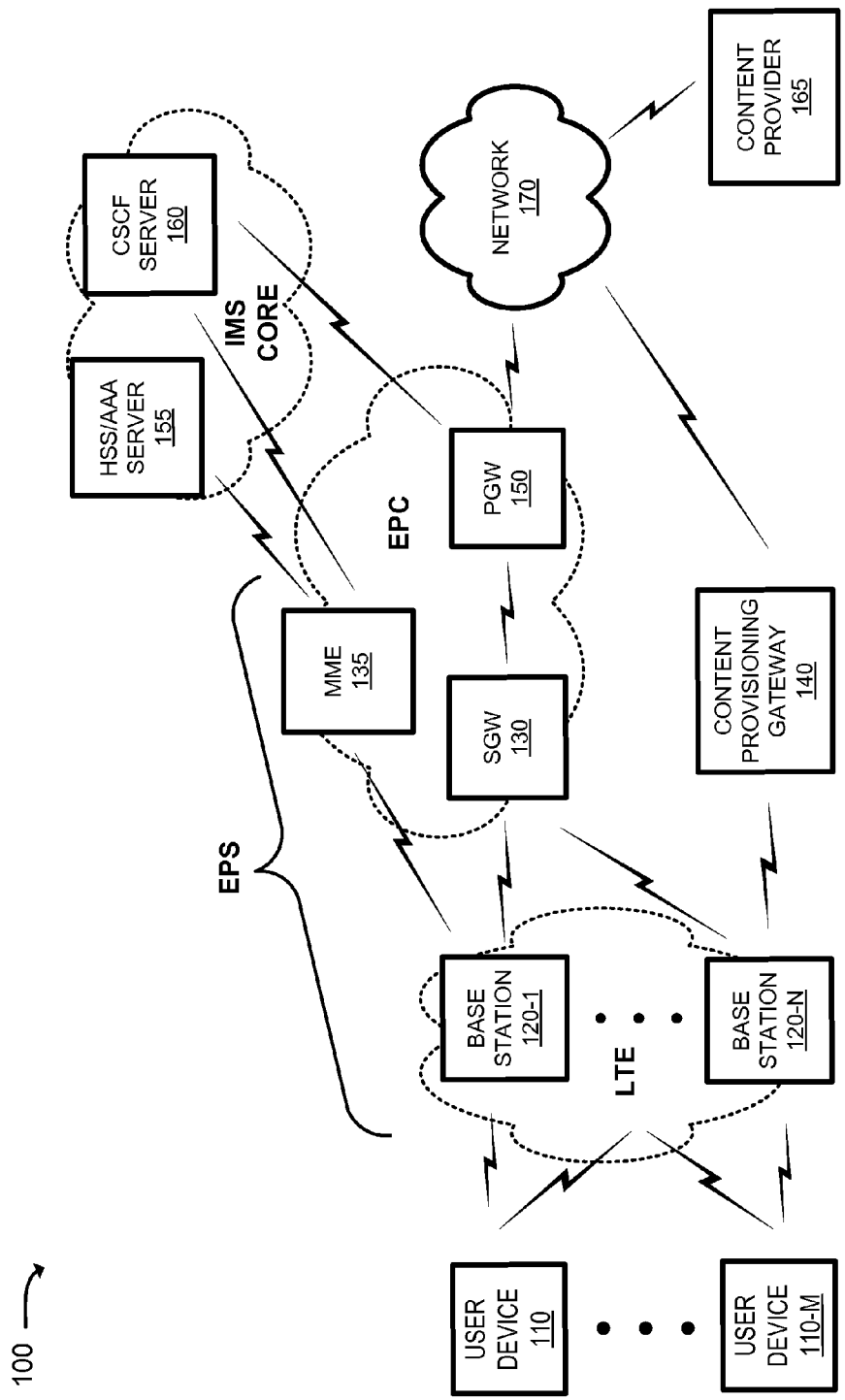
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a group of user devices 110-1, ..., 110-M (where M≥1) (hereinafter referred to collectively as "user devices 110" and individually as "user device 110"), a group of base stations 120-1, ..., 120-N (where N≥1) (hereinafter referred to collectively as "base stations 120" and individually as "base station 120"), a serving gateway 130 (hereinafter referred to as "SGW 130"), a mobility management entity device 135 (hereinafter referred to as "MME 135"), a content provisioning gateway 140 (hereinafter referred to as "content gateway 140"), a packet data network (PDN) gateway (PGW) 150, a home subscriber server (HSS)/authentication, authorization, accounting (AAA) server 155 (hereinafter referred to as an "HSS/AAA server 155"), a call session control function (CSCF) server 160 (hereinafter referred to as "CSCF server 160"), a content provider 165, and a network 170. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Implementations are described as being performed within a RAN that is based on a long term evolution (LTE) network for explanatory purposes. In other implementations, the implementations may be performed within a RAN that is not based on a LTE network.

Environment 100 may include an evolved packet system (EPS) that includes a LTE network and/or an evolved packet core (EPC) that operate based on a third generation partnership project (3GPP) wireless communication standards. The LTE network may be a RAN that includes one or more base stations 120 that take the form of evolved Node Bs (eNBs) via which user devices 110 communicate with the EPC. The EPC may include SGW 130, MME 135, and/or PGW 150 that enable user devices 110 to communicate with network 170 and/or an Internet protocol (IP) multimedia subsystem (IMS) core. The IMS core may include HSS/AAA server 155 and/or CSCF server 160 and may manage authentication, session initiation, account information, profile information, etc. associated with user devices 110.

User device 110 may include any computation or communication device, such as a wireless mobile communication device that is capable of communicating with base station 120 and/or a network (e.g., network 170). For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 110 may send traffic to and/or receive traffic from network 170.

User device 110 may host a client application that collects service information that includes, for example, usage information, radio information, and/or service quality information based on communications with base station 120. The usage information may, for example, identify an application and/or service that is accessed by user device 110, a frequency band via which the application is accessed by user device 110, a period of time when the application and/or service was accessed by user device 110, etc. The radio information may identify signal strength (e.g., a power level, a reference signal received power (RSRP) level, a relative signal strength indication (RSSI), etc.), bandwidth usage, signal noise (e.g., a signal-to-interference noise ratio (SINR), etc.), etc. associated with communications with base station 120. The radio information may also identify a presence of jitter, dropped packets, mis-ordered packets, delayed packets, etc. associated with the communications. The client application may cause user device 110 to transmit the service information to content gateway 140 via base station 120.

Base station 120 may include one or more devices that receive, process, and/or transmit traffic, such as audio, video, text, and/or other data, destined for and/or received from user device 110. In an example implementation, base station 120 may be an eNB associated with the LTE network that receives traffic from and/or sends traffic to network 170 via SGW 130 and PGW 150. Base station 120 may send traffic to and/or receive traffic from user device 110 via an air interface. Base station 120 may send traffic to and/or receive traffic from user device 110 via an air interface. One or more of base stations 120 may be associated with a RAN. The RAN may be associated with the LTE network. In another example, one or more other base stations 120 may be associated with a RAN that is not associated with the LTE network.

Base station 120 may transmit information associated with traffic load conditions (e.g., hereinafter referred to as "traffic load information") to content gateway 140. Traffic load information may identify a quantity of bandwidth being processed by base station 120, a quantity of bandwidth that is available relative to a bandwidth capacity of base station 120 (e.g., a maximum quantity of bandwidth that can be processed, by base station 120, relative to each carrier band, channel, etc.), and/or a quantity of applications and/or services being provisioned via base station 120. The traffic load information may also identify a type of content being provisioned (e.g., unicast, multicast, video, voice, text, etc.) via base station 120, a quantity of user devices 110 being served by base station 120, etc.

Base station 120 may receive resource scheduling information that identifies bandwidth resources (e.g., frequency bands, quantities of bandwidth, resource blocks, etc.), and/or time resources (e.g., periods of time, quantity of subframes, etc.) that are allocated to provision applications and/or services to user devices 110 being serviced by base station 120. The bandwidth resources may correspond to quantities of bandwidth (e.g., quantities of resource blocks) that identify a quantity of bits of traffic and/or a quantity of packets, within a period of time, that are permitted to be used, by base station 120, to provision the applications and/or services. The time resources may correspond to periods of time (e.g., quantities of subframes) that are permitted to be used, by base station 120, to provision the applications and/or services.

Additionally, or alternatively, the resource scheduling information may include information that identifies a modulation and coding scheme (MCS) (e.g., based on a MCS index) to be used to provision the applications and/or services. The MCS index may include a value that corresponds to a type of modulation (e.g., binary phase-shift keying (BPSK), quadrature phase-shift keying (QPSK), quadrature amplitude modulation (QAM), etc.), a data rate, a channel bandwidth, etc. to be used to provision the applications and/or services.

SGW 130 may include one or more devices, or other types of computation or communication devices, that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 130 may, for example, aggregate traffic received from one or more base stations 120 and may send the aggregated traffic to network 170. SGW 130 may also receive traffic from network 170 and may send the received traffic to user device 110 via base station 120. SGW 130 may perform handoff operations between cells and/or base stations 120 via which user device 110 is communicating.

Content gateway 140 may include one or more devices, or other types of computation or communication devices, that gather, process, search, store, and/or provide information in a manner described herein. In an example implementation, content gateway 140 may process unicast and/or multicast content to be distributed to one or more user devices 110. For example, content gateway 140 may receive content (e.g., streaming video and/or audio, progressive video and/or audio, etc.) from content provider 150. Content gateway 140 may transmit the content to user device 110 via network 170, SGW 130 and/or base station 120. Content gateway 140 may buffer the content to ensure that the content is transmitted at a bandwidth and/or data rate that conforms to a policy associated with network 170, that abides by a service level agreement with user device 110, and/or that can be processed by user device 110. Content gateway 140 may transmit the content as unicast content or multicast content.

Content gateway 140 may communicate with user device 110, via base station 120, to obtain service information (e.g., usage information, radio information, and/or service quality information) associated with user device 110. Content gateway 140 may use the service information to identify applications and/or services that are being accessed by user device 110 and/or respective periods of time that each of the applications and/or services are being accessed by user device 110. Content gateway 140 may use the service information to identify bandwidth resources (e.g., frequency bands, bandwidth, resource blocks, etc.) used, by user device 110, to obtain the applications and/or services. Additionally, or alternatively, content gateway 140 may use the service information to identify time resources (e.g., periods of time, quantities of subframes) being used to obtain the applications and/or services. Content gateway 140 may use the service information to identify a MCS being used to obtain the applications and/or services.

Content gateway 140 may use the service information to identify service conditions associated with user device 110. For example, content gateway 140 may use the service information to identify a service condition when a service, being accessed by user device 110, has not been available for a period of time that is greater than a threshold. In another example, content gateway 140 may use the service information to identify a service condition when a signal strength, associated with communications via which the service is being accessed, is less than a threshold (e.g., less than a minimum signal power level, RSRP level, RSSI, SINR, etc.).

Content gateway 140 may communicate with base stations 120, via SGW 130, to obtain traffic load information associated with each base station 120. Content gateway 140 may use the traffic load information and/or service information (e.g., obtained from user devices 110) to allocate RAN resources among each of base stations 120 associated with the RAN. Content gateway 140 may use previous traffic load information and/or prior service information to forecast how RAN resources are to be allocated at a future point in time to ensure that base stations 120 do not become congested. Content gateway 140 may also use previous traffic load information and/or prior service information to ensure, at the future point in time, that user device 110 receives applications and/or services associated with a service quality and/or signal quality for which user device 110 has subscribed.

Content gateway 140 may generate respective resource schedule information, for each base station 120 associated with the RAN, that identifies a manner in which frequency bands (e.g., associated with quantities of bandwidth) are to be allocated to applications and/or services provisioned by base stations 120. The frequency bands may, for example, correspond to a PCS band, an advanced wireless services (AWS) band, a cellular band, an upper 700 mega hertz (MHz) band, a lower 700 MHz band, and/or other bands identified by a 3GPP standards, etc.

Content gateway 140 may, for example, generate resource schedule information that causes a quantity of bandwidth, subframes, resource blocks, etc., used to provision an application, to increase or decrease based on the traffic load information and/or the service information. The quantity of bandwidth, subframes, resource blocks, etc. may be increased when the traffic load information indicates that a quantity of user devices 110, which are accessing the application, are greater than a first threshold. Content gateway 140 may, in another example, decrease a quantity of frequency bands assigned to an application and/or service when the traffic load information indicates that a quantity of bandwidth, subframes, and/or time slots, used to provision the application and/or service, is less than a second threshold.

In yet another example, content gateway 140 may increase a quantity of bandwidth, subframes, resource blocks, etc., to be used to provision an application and/or service, when the service information indicates that a period of time when the application was and/or was not available to the a group of user devices 110 is greater than an third threshold. Content gateway 140 may use the service information to allocate base stations 120 to provision services, to user devices 110, with a level of signal quality that is greater than a signal quality threshold.

Content gateway 140 may, in a further example, generate resource schedule information that causes an MCS, used to provision an application and/or service, to change based on the traffic load information and/or the service information. Causing the MCS to change may allow content gateway 140 to increase or decrease throughput (e.g., data rate), used to provision the application and/or service, within a fixed quantity of bandwidth (e.g., associated with a frequency band and/or channel).

Content provider 150 may include any type or form of content provider. For example, content provider 150 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from web sites and/or permit content to be downloaded (e.g., via progressive download, etc.). Content provider 150 may include on-demand content providers (e.g., video on demand (VOD), pay per view (PPV), etc.). A media stream, as used herein, may refer to a stream of content that includes video content (e.g., a video stream), audio content (e.g., an audio stream), and/or textual content (e.g., a textual stream).

Network 170 may include one or more wired and/or wireless networks. For example, network 170 may include a cellular network, a public land mobile network (PLMN), a second generation (2G) network, a third generation (3G) network, a fourth generation (4G) network, a fifth generation (5G) network, and/or another network. Additionally, or alternatively, network 170 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

Figure 2:
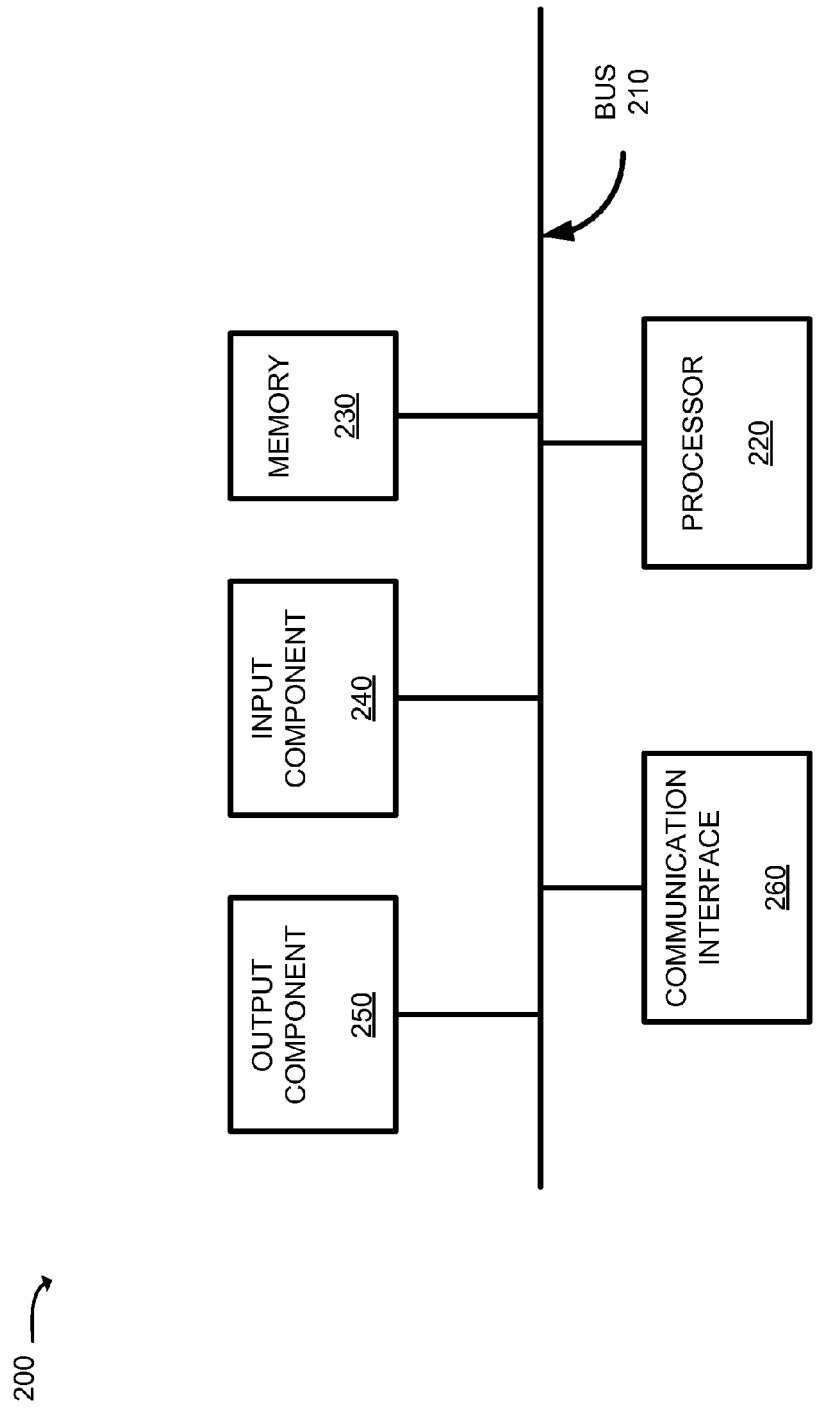
FIG. 2 is a diagram of example components of one or more devices of FIG. 1.

FIG. 2 is a diagram of example components of a device 200. Device 200 may correspond to user device 110, content gateway 140, and/or content provider 150. Alternatively, or additionally, each of user device 110, content gateway 140, and/or content provider 150 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 170. In one alternative implementation, communication interface 260 may be a logical component that includes input and output ports, input and output systems, and/or other input and output components that facilitate the transmission of data to other devices.

As described herein, device 200 may perform certain operations to dynamically allocate RAN resources based on feedback received from user devices 110. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
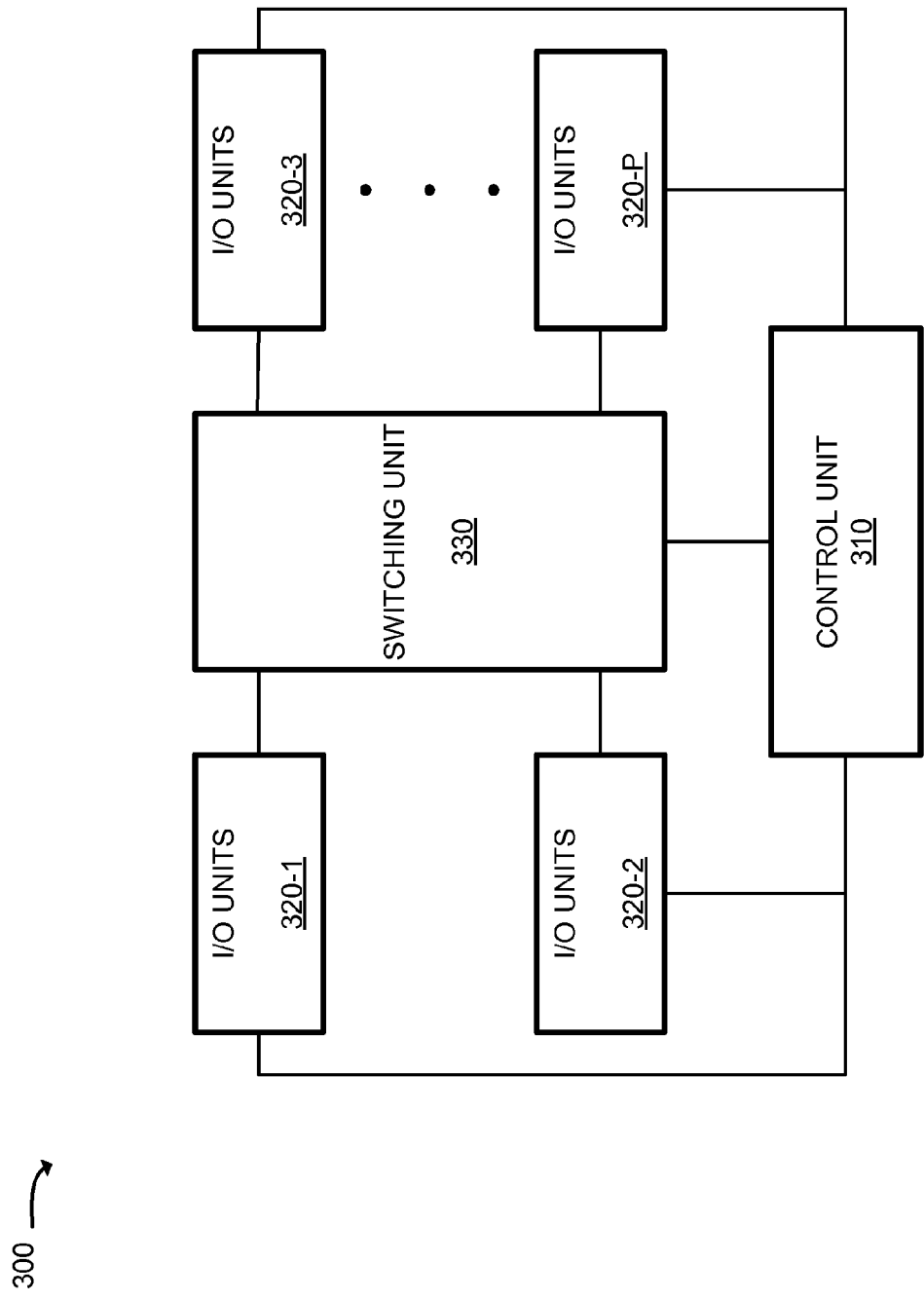
FIG. 3 is a diagram of example components of another one or more devices of FIG. 1.

FIG. 3 is a diagram of example components of device 300 that may correspond to one or more of base station 120 and/or SGW 130. Alternatively, or additionally, base station 120 and/or SGW 130 may include one or more devices 300. Although, FIG. 3 illustrates example components of device 300, in other implementations, device 300 may include additional components, fewer components, different components, or differently arranged components than those illustrated in FIG. 3 and described herein. Additionally, or alternatively, one or more operations described as being performed by a particular component of device 300 may be performed by one or more other components, in addition to or instead of the particular component of device 300.

Device 300 may receive network traffic, as one or more packet stream(s), from physical links, may process the packet stream(s) to determine destination information, and may transmit the packet stream(s) out on links in accordance with the destination information. Device 300 may include a control unit 310, a set of input/output (I/O) units 320-1, . . . , 320-P (where P≥1) (hereinafter referred to collectively as "I/O units 320" and individually as "I/O unit 320"), and a switching unit 330.

Control unit 310 may include a processor, a microprocessor, or some form of hardware logic (e.g., an application specific integrated circuit (ASIC) or a field programmable gate array (FPGA)). Control unit 310 may also include a memory that can be accessed to perform instructions contained in the memory. In one example implementation, control unit 310 may include an Ethernet controller and/or another controller device. Control unit 310 may perform high level management functions for device 300. For example, control unit 310 may maintain the connectivity and manage information/data necessary for transferring data by device 300. Control unit 310 may create routing tables based on network topology information, create forwarding tables based on the routing tables, and communicate the forwarding tables to I/O units 320. I/O units 320 may use the forwarding tables to perform route lookup for incoming data and perform the forwarding functions for device 300. Control unit 310 may also perform other general control and monitoring functions for device 300.

I/O unit 320 may include a component or collection of components to receive incoming data, to process incoming and/or outgoing data, and/or to transmit outgoing data. For example, I/O unit 320 may include I/O ports, an Ethernet interface and/or another type of interface, a central processing unit (CPU), and/or a memory device. I/O unit 320 may include a collection of ports that receive or transmit data via physical links I/O unit 320 may also include data processing component(s), switch interface component(s), Internet processor component(s), memory device(s), etc.

Each of I/O units 320 may be connected to control unit 310 and switching unit 330. I/O units 320 may receive data on physical links connected to a network (e.g., network 170). Each physical link could be one of many types of transport media, such as an optical fiber or an Ethernet cable.

I/O units 320 may process incoming data prior to transmitting the data to another I/O unit 320 or a physical link. I/O units 320 may perform route lookups for the data using the forwarding table from control unit 310 to determine destination information. If the destination indicates that the data should be sent out on a physical link, connected to I/O unit 320, then I/O unit 320 may prepare the data for transmission by, for example, adding any necessary headers and/or modifying existing headers, and/or transmitting the data from the port associated with the physical link. If the destination indicates that the data should be sent to another I/O unit 320 via switching unit 330, then I/O unit 320 may, if necessary, prepare the data for transmission to the other I/O unit 320 and/or may send the data to the other I/O unit 320 via switching unit 330.

Switching unit 330 may include one or multiple switching planes to facilitate communication among I/O units 320 and/or control unit 310. In one implementation, each of the switching planes may include a single-stage switch or a multi-stage switch of crossbar elements. Switching unit 330 may also, or alternatively, include processors, memories, and/or paths that permit communication among I/O units 320 and/or control unit 310.

As described herein, device 300 may perform certain operations to dynamically allocate RAN resources based on feedback received from user devices 110. Device 300 may perform these operations in response to control unit 310 and/or one or more I/O units 320 executing software instructions contained in a computer-readable medium, such as a memory associated with control unit 310 and/or the one or more I/O units 320, respectively. The software instructions may be read into the memory from another computer-readable medium or from another device. The software instructions contained in the memory may cause control unit 310 and/or the one or more I/O units 320 to perform processes described herein. Alternatively, hardwired circuitry may be used in place of or in combination with software instructions to implement processes described herein. Thus, implementations described herein are not limited to any specific combination of hardware circuitry and software.

FIG. 4 is a diagram of an example data structure 400 that stores service information that identifies a level of signal quality and/or service quality associated with an application and/or service being accessed by user device 110. Data structure 400 may be stored in a memory and/or storage device associated with content gateway 140. Data structure 400 may include a collection of fields, such as a user device identifier (ID) field 405, a service ID field 410, a service type field 415, a frequency band field 420, a base station ID field 425, a time field 430, a signal quality field 435, and a service quality field 440. Data structure 400 includes fields 405-440 for explanatory purposes. In practice, data structure 400 may include additional fields, fewer fields, different fields, and/or differently arranged fields than are described with respect to flow data structure 400.

User device ID field 405 may store information, associated with a particular user device 110, such as a device identifier (e.g., a MDN, LDN, etc.), a network address (e.g., an IP address, a MAC address, etc.), etc. Service ID field 410 may store information that identifies an application and/or service that is being accessed by the particular user device 110. For example, the information that identifies the application and/or service may include an application identifier (e.g., an application name, etc.), an access point name (APN) associated with the application and/or service, information that identifies a flow (e.g., a flow identifier) associated with the application and/or service, etc.

Service type field 415 may store information that identifies a type of traffic associated with the application and/or service identified in service ID field 410. For example, service type field 415 may store information that identifies whether the type of traffic is unicast, multicast, and/or broadcast traffic. In another example, service type field may store information that identifies whether the traffic is associated with streaming video, streaming audio, messaging traffic (e.g., instant messaging, email, etc.), Internet traffic (e.g., based on browsing, etc.) and/or other types of traffic. Frequency band field 420 may store information that identifies a particular frequency band via which the application and/or service, identified in service ID field 410, is being accessed by the particular user device 110. For example, frequency band field 420 may store information that identifies a portion of a frequency band, such as, for example, a PCS band (e.g., 1.85-1.99 gigahertz (GHz)), an AWS band (e.g., 1.71 to 1.755 GHz), an upper 700 MHz band, a lower 700 MHz band, a cellular band (e.g., 850 MHz) and/or some other band (e.g., as identified by 3GPP standards). Frequency band 420 may also identify a quantity of bandwidth, a data rate, an MCS, etc. associated with the identified frequency band being used by the particular user device 110. Base station ID field 425 may store information that identifies via which base station 120 the particular user device 110 is accessing the application and/or service.

Time field 430 may store information that identifies when and/or for how long the particular user device 110 accessed the application and/or service. Signal quality field 435 may store information that identifies a level of signal quality being received, by the particular user device 110, from base station 120. The level of signal quality may, for example, represent a measure of signal strength (e.g., a signal power level, RSRP level, RSSI, SINR, etc.). Service quality field 440 may store information that identifies a level of service quality associated with the application and/or service being accessed by the particular user device 110. The level of service quality may, for example, represent a measure of availability of the application and/or service. The measure of availability may correspond to a period of time that a user, of user device 110, was able to actually use and/or interact with the application and/or services relative to the time period, identified in time field 430, that the particular user device 110 was accessing the application and/or service.

Content gateway 140 may, for example, obtain service information from user device 110 and may store, in data structure 400, information associated with user device 110 (e.g., MDN1), an identifier associated with an application and/or service being accessed by user device 110 (e.g., APN1) and an indication that the application is being accessed, via base station 120-1 (e.g., 120-1), as multicast content (e.g., MC) (e.g., as shown by ellipse 432). Content gateway 140 may also store information that identifies a frequency band (e.g., band 1) being used, by base station 120-1, to provision the application and/or service, a period of time (e.g., time1) that user device 110 accessed the application and/or service (e.g., as shown by ellipse 432). Content gateway 140 may also store information that identifies a level of signal quality (e.g., signal1) and/or service quality (e.g., service1) (e.g., as shown by ellipse 432).

Content gateway 140 may obtain other service information from other user devices 110. In one example, content gateway 140 may store service information obtained from another user device 110 (e.g., MDN2) that is accessing the application and/or service (e.g., APN1), via base station 120-1 and using a different frequency band (e.g., band 2) (e.g., as shown by ellipse 434). Content gateway 140 may store information that identifies another level of signal quality (e.g., signal2) and/or service quality (e.g., service2) being received by the other user device 110 (e.g., as shown by ellipse 434). In another example, content gateway 140 may store service information obtained from further user devices 110 (e.g., MDN3, MDN4, etc.) that are accessing other services and/or applications (e.g., service1, application1), via other base stations 120 (e.g., 120-2, 120-3, etc.) (e.g., as shown by ellipses 436 and 438, respectively). Content gateway 140 may also store information that identifies other frequency bands (e.g., band 1, band 3, etc.) being used to access, for further periods of time (e.g., time3, time4, etc.), the other applications and/or services as unicast (e.g., UC), multicast, and/or broadcast (e.g., BC) content (e.g., as shown by ellipses 436 and 438, respectively). Content gateway 140 may store information that identifies further levels of signal quality (e.g., signal3, signal4, etc.) and/or service quality (e.g., service3, service4, etc.) being received by the further user devices 110 (e.g., as shown by ellipses 436 and 438, respectively).

Figure 5:
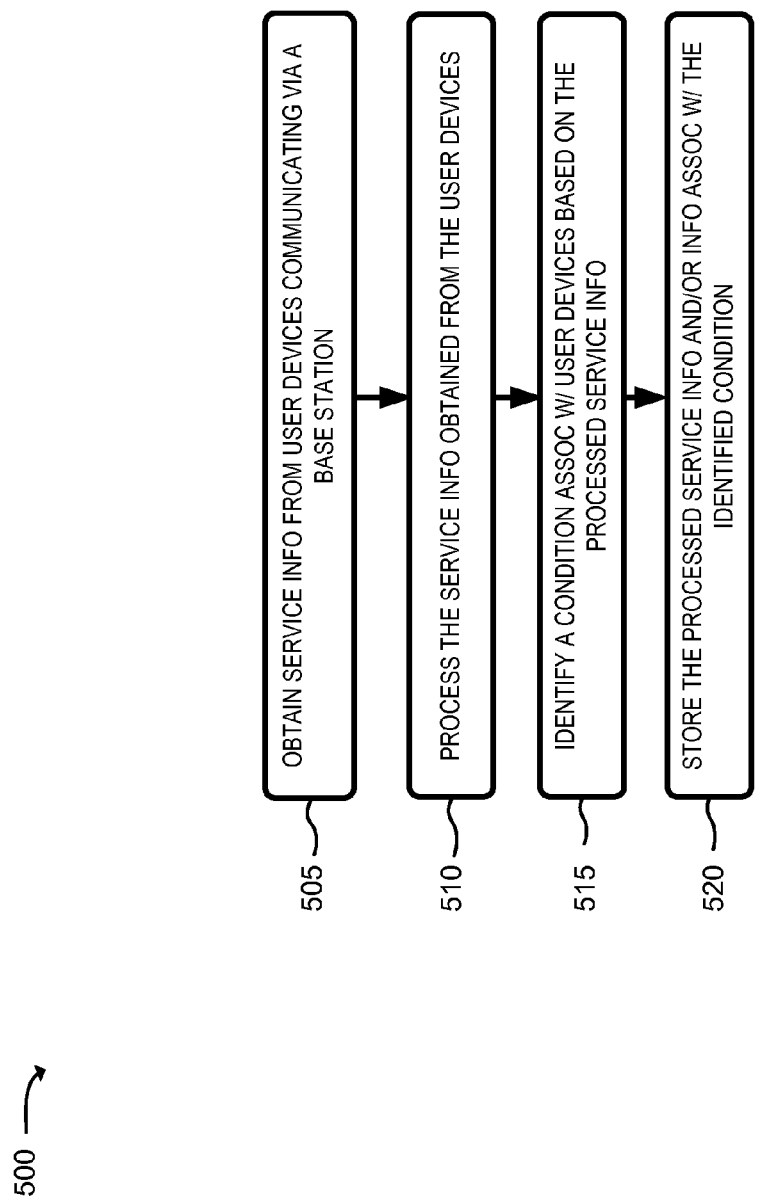
FIG. 5 is a flow chart of an example process for obtaining and/or processing service information, obtained from one or more user devices, according to an implementation described herein.

FIG. 5 is a flow chart of an example process for obtaining and/or processing service information, obtained from one or more user devices 110, according to an implementation described herein. In one example implementation, process 500 may be performed by content gateway 140. In another example implementation, some or all of process 500 may be performed by a device or collection of devices separate from, or in combination with content gateway 140.

As shown in FIG. 5, process 500 may include obtaining service information from one or more user devices communicating via a base station (block 505). For example, content gateway 140 may determine that service information is to be obtained from one or more user devices 110 that are communicating with a network (e.g., network 170) via a RAN. Content gateway 140 may base the determination, that the service information is to be obtained, on a predetermined time (e.g., based on a particular time of the day, etc.), a time interval (e.g., every third minutes, one hour, two hours, six hours, etc.), as a result of an occurrence of some event (e.g., an indication that base station 120 is congested), etc. Based on the determination that the service information is to be obtained, content gateway may transmit a request, to user devices 110 and via base stations 120 associated with the RAN, to obtain the service information from each of user devices 110.

User device 110 may receive the request and may use a client application to identify a level of signal quality being received from base station 120. For example, user device 110 may, in response to the request, identify a power level, a signal-to-noise ratio, a level of channel isolation, etc. associated with a signal being received, from base station 120, by user device 110. User device 110 may use the client application to identify a level of service quality associated with accessing an application via base station 120. For example, content gateway 140 may, in response to the request, identify a period of time during which the application has been available to be used by user device 110 (e.g., when the application has not stalled, is not downloading, is not restarting, is not malfunctioning, etc.), relative to another period of time associated with accessing the application. In another example, content gateway 140 may identify a quantity of dropped packets, a quantity of mis-ordered packets, a presence of jitter, etc. associated with accessing the application.

User device 110 may also use the client application to obtain usage information associated with accessing the application. For example, user device 110 may, in response to the request, identify the application that is being accessed, base station 120 via which the application is being accessed, a carrier band being used to access the application, the other time period when the application is being accessed, a location associated with user device 110, etc. User device 110 may transmit, as the service information and to content gateway 140, the level of signal quality, the level of service quality, and/or the usage information. Content gateway 140 may receive the service information form user device 110. Content gateway 140 may also receive other service information from other user devices 110 communicating with other base stations 120.

As also shown in FIG. 5, process 500 may include processing the service information obtained from the user devices (block 510) and identifying a condition associated with the user devices based on the processed service information (block 515). For example, content gateway 140 may process the service information to identify whether any user devices 110 are receiving signals associated with a low level of signal quality (e.g., when the level of signal quality is less than a signal threshold). In another example, content gateway 140 may process the service information to determine whether any of user devices 110 are accessing applications and/or services with a low level of service quality (e.g., when the level of service quality is less than a service threshold). Content gateway 140 may determine that a signal quality condition exists when a quantity of user devices 110, associated with the low level of signal quality, is greater than a signal condition threshold. Content gateway 140 may, in another example, determine that a service quality condition exists when another quantity of user devices 110, associated with the low level of service quality, is greater than a service condition threshold.

Content gateway 140 may also process the service information to identify a portion of user devices 110, with which the service and/or signal conditions are associated, that are communicating via a particular base station 120 and/or geographic area within the RAN (e.g., based on locations of the portion of the user devices 110). Content gateway 140 may determine whether a quantity of user devices 110, associated with the identified portion of user devices 110, is greater than a threshold. Based on a determination that the quantity of user devices 110 is greater than a threshold, content gateway 140 may identify a condition associated with the particular base station 120 and/or one or more base stations 120 that provide cell coverage for the geographic area.

As further shown in FIG. 5, process 500 may include storing the processed service information and/or information associated with the identified condition (block 520). For example, content gateway 140 may store the service information and/or the processed service information in a memory and/or storage device associated with content gateway 140. In one example, content gateway 140 may store the service information and/or processed service information in a data structure (e.g., data structure 400 of FIG. 4). Content gateway 140 may also store, in the memory and/or storage device, information associated with the identified conditions to be used by content gateway 140 to allocate RAN resources (e.g., frequency bands, bandwidth, data rates, MCS indices, etc.) for provisioning applications and/or services to user devices 110.

FIG. 6 is a diagram of an example data structure 600 that stores resource scheduling information associated with base station 120. Data structure 600 may be stored in a memory and/or storage device associated with base station 120 and/or content gateway 140. Data structure 600 may include a collection of fields, such as a schedule identifier (ID) field 605, a time field 610, a base station ID field 615, a service ID field 620, a service type field 625, a frequency band field 630 and/or a bandwidth field 635. Data structure 600 includes fields 605-635 for explanatory purposes. In practice, data structure 600 may include additional fields, fewer fields, different fields, and/or differently arranged fields than are described with respect to flow data structure 600.

Schedule ID field 605 may store information that uniquely identifies (e.g., such as a SIB identifier) particular resource scheduling information, that is stored in data structure 600, from other scheduling information that was previously stored within data structure 600. Time field 410 may store information that identifies a period of time during which the resource scheduling information is in effect and/or is to be used by a particular base station 120 to provision applications and/or services to user devices 120 that are served by the particular base station 120. Base station ID field 615 may store information that identifies the particular base station 120 to which the resource scheduling information, identified in schedule ID field 605, corresponds.

Service ID field 620 may store information that identifies one or more applications and/or services that are to be provisioned, by the particular base station 120, to user devices 120 served by the particular base station 120. Service type field 625 may store information that identifies a manner in which the applications and/or services are to be provisioned (e.g., via multicast, broadcast, unicast, streaming media, progressive download, etc.) to user devices 110 that are served by the particular base station 120.

Frequency band field 630 may store information that identifies a respective frequency band to be used to provision each of the applications and/or services. For example, the identified frequency bands may include a PCS band (e.g., 1.85-1.99 gigahertz (GHz)), an AWS band (e.g., 1.71 to 1.755 GHz), an upper 700 MHz band, a lower 700 MHz band, a cellular band (e.g., 850 MHz) and/or some other band (e.g., as identified by one or more 3GPP standards). Bandwidth field 635 may store information that identifies a respective quantity of bandwidth, a data rate, a quantity of subframes and/or time slots, and/or an MCS index to be used to provision each of the applications and/or services, based on the respective frequency bands identified in frequency band field 630.

Content gateway 140 may, for example, obtain traffic load information, from each base station 120 associated with a RAN. Content gateway 140 may generate resource schedule information, associated with base station 120, based on traffic load information obtained from base station 120 and/or service information obtained from user devices 110 that are served by base station 120.

The traffic load information may identify a quantity of bandwidth, a data rate, a quantity of subframes and/or time slots, and/or an MCS that is being processed by base station 120. The traffic load information may also, or alternatively, identify a respective quantity of bandwidth, a data rate, a quantity of subframes and/or time slots, and/or an MCS being used, by base station 120, to provision each application and/or service, and/or a capacity associated with base station 120 (e.g., a maximum quantity of bandwidth, data rate, and/or subframes and/or timeslots that can be processed, relative to each carrier band, channel, etc.). The traffic load information may also identify a quantity of applications and/or services being provisioned via base station 120, a type of content being provisioned (e.g., unicast, multicast, video, voice, text, etc.) via base station 120, user devices 110 being served by base station 120, etc.

Content gateway 140 may use the traffic load information and/or the service information to allocate processing resources associated with base station 120. For example, content gateway 140 may store, within data structure 600, information associated with an application and/or service (e.g., APN1) and/or an indication that the application and/or service is to be provisioned as multicast content (e.g., MC) (e.g., as shown by ellipses 637 and 639). Content gateway 140 may store information that indicates that the application and/or service is to be provisioned using a first quantity of bandwidth (e.g., BW1) associated with a first frequency band (e.g., band 1) and/or a data rate (e.g., DR2) associated with a second frequency band (e.g., band 2) (e.g., as shown by ellipses 637 and 639, respectively).

Content gateway 140 may store, within data structure 600, information associated with other applications (e.g. appication1) and/or services (e.g., service1) and/or an indications that the applications and/or services are to be provisioned as unicast content (e.g., UC) and/or broadcast content (e.g., BC) (e.g., as shown by ellipses 641 and 643, respectively). Content gateway 140 may store resource scheduling information that indicates that the other applications and/or services are to be provisioned using a quantity of subframes and/or time slots (e.g., SF3) associated with a third frequency band (e.g., band 3) and/or a MCS index (e.g., MCS4) associated with fourth and/or fifth frequency bands (e.g., band 4 & 5) (e.g., as shown by ellipses 641 and 643, respectively).

FIG. 7 is a flow chart of an example process 700 for generating resource scheduling information, associated with base station 120, according to an implementation described herein. In one example implementation, process 700 may be performed by content gateway 140. In another example implementation, some or all of process 700 may be performed by a device or collection of devices separate from, or in combination with content gateway 140.

As shown in FIG. 7, process 700 may include obtaining traffic load information from base stations associated with a RAN (block 705). For example, content gateway 140 may determine that traffic load information is to be obtained from one or more base stations 120 associated with a RAN. Content gateway 140 may obtain the traffic load information based on a predetermined time (e.g., a particular time of the day, etc.), a time interval (e.g., every thirty minutes, one hour, two hours, six hours, etc.), as a result of an occurrence of some event (e.g., an indication that base station 120 is congested), etc. Based on the determination that the traffic load information is to be obtained, content gateway 140 may transmit an instruction, to base stations 120, to send traffic load information to content gateway 140. Base stations 120 may receive the instruction and may transmit, to content gateway 140, the traffic load information. Content gateway 140 may receive the traffic load information from base stations 120.

As also shown in FIG. 7, process 700 may include identifying traffic load conditions, associated with a base station, based on the traffic load information (block 710). For example, content gateway 140 may use the traffic load information to identify applications and/or services that are being provisioned via base station 120. Content gateway 140 may use the traffic load information to identify a respective quantity of user devices 110, being served by base station 120, that are accessing each of the applications and/or services. Content gateway 140 may use the traffic load information to identify a respective one or more frequency bands, a respective quantity of bandwidth, a respective data rate, a respective quantity of subframes and/or time slots, and/or a respective MCS index, used by base station 120, to provision each application and/or service. Content gateway 140 may use the traffic information to identify a manner in which base station 120 is to provision the applications and/or services (e.g., as broadcast, multicast, unicast, streaming media, progressive download, etc.). Content gateway 140 may use the traffic load information to determine a quantity of bandwidth, data rate, quantity of subframes and/or time slots, and/or MCS index being processed by base station 120 relative to each frequency band.

Content gateway 140 may use the traffic load information to determine whether base station 120, associated with the RAN, is congested and/or has reached capacity. For example, content gateway 140 may determine that a quantity of user devices 110, being served by base station 120, is greater than a device threshold associated with base station 120. Based on the determination that the quantity of user devices 110, being served by base station 120, is greater than the device threshold, content gateway 140 may determine that base station 120 has reached capacity.

In another example, content gateway 140 may determine that a quantity of bandwidth, data rate and/or a quantity of subframes and/or time slots, that is being used to provision an application and/or service, is greater than a maximum threshold associated with a frequency band. Based on the determination that the quantity of bandwidth, data rate, and/or quantity of subframes and/or time slots is greater than the maximum threshold, content gateway 140 may determine that the frequency band, used to provision the application and/or service, has reached capacity.

As further shown in FIG. 7, process 700 may include retrieving service information associated with user devices being served by the base station (block 715). For example, content gateway 140 may retrieve, from a memory associated with content gateway server 140, service information (e.g., such as service information stored in data structure 400 of FIG. 4) obtained from user devices 110 that are served by base station 110. The service information may identify user devices 110 being served by base station 120, applications and/or services being accessed by user devices 110, carrier frequencies, quantities of bandwidth, data rates, quantities of subframes and/or time slots, and/or MCS indices being used to provision the applications and/or services, etc. The service information may identify a manner in which the applications and/or services are being provisioned (e.g., as multicast, unicast, broadcast, streaming media, etc.) by base station 120 and/or periods of time that user devices 110 are accessing the applications and/or services. The service information may also identify a respective level of signal quality being received by user devices 110 and/or which of user devices 110 is receiving low signal quality. The service information may further identify a respective level of service quality being received by user devices 110 and/or which of user devices 110 is receiving low service quality.

As yet further shown in FIG. 7, process 700 may include generating resource scheduling information, associated with the base station, based on the identified traffic load conditions and/or the service information (block 720). For example, content gateway 140 may use the traffic load information and/or service information to generate resource schedule information to be used, by base station 120, to provision applications and/or services to user devices 110 that are served by base station 120. Content gateway 140 may, for example, generate the resource schedule information to assign resources (e.g., bandwidth, data rates, subframes and/or time slots, MCS indices, carrier frequencies, processing capacity, etc.) in a manner that allows base station 120 to provision the applications and/or resources without becoming congested. In another example, content gateway 140 may generate the resource schedule information to assign the resources in a manner that enable user devices 110 to access the applications and/or services without experiencing low service quality and/or low signal quality.

Content gateway 140 may generate resource schedule information that increases bandwidth resources (e.g., associated with a quantity of frequency bands, a data rate, a quantity resource blocks) and/or time resources (e.g., periods of time, a quantity of subframes) to be used to provision an application and/or service. Content gateway 140 may, for example, cause the number of frequency bands to increase (e.g., relative to another number of frequency bands previously used to provision the application) when the traffic load information indicates that quantity of user devices 110 accessing the application and/or service is greater than a threshold.

Content gateway 140 may, in another example, generate resource schedule information that increases the bandwidth resources and/or time resources when the traffic load information indicates that a quantity of bandwidth, a data rate, a quantity of subframes and/or time slots, etc., used by base station 120 to provision the application and/or service, is greater than another threshold. Content gateway 140 may also, or alternatively, modify a MCS index when the traffic load information indicates that a quantity of bandwidth, a data rate, a quantity of subframes and/or time slots, etc., used by base station 120 to provision the application and/or service, is greater than the other threshold. Modifying the MCS index may increase a quantity of throughput, associated with provisioning the application and/or service, without increasing a quantity of bandwidth used to provision the application and/or service.

Content gateway 140 may generate resource schedule information that causes base station 120 to provision an application in a manner that allows the user devices 110 to access the application without experiencing low service quality (e.g., as identified by the service information). In this example, content gateway 140 may generate resource schedule information that assigns bandwidth resources (e.g., a quantity of bandwidth, a quantity of resource blocks, a number of frequency bands, etc.), time resources (e.g., periods of time, a quantity of subframes, etc.), and/or a MCS index to the application. Assigning the bandwidth resources, time resources, and/or the MCS index may allow base station 120 to provision the application, to user devices 110, in a manner that causes the level of service quality, received by the user devices 110, to be greater than a service threshold. The assigned bandwidth resources, time resources, and/or MCS index may be greater than other bandwidth resources, time resources, and/or MCS index that was previously used, by base station 120, to provision the application when user devices 110 were experiencing low service quality.

Content gateway 140 may generate resource schedule information that causes base station 120 to transmit a service, which was previously transmitted as multicast content, as unicast content when service information indicates that a period of time that the service was available, to a group of user devices 110, is less than an availability threshold. The unicast content may use less bandwidth, fewer subframes and/or time slots, a lower data rate, and/or a different MCS index than the multicast content, which may allow content gateway 140 to assign additional bandwidth and/or other resources to another service and/or application.

In another example, content gateway 140 may, based on the service information, determine that a group of user devices 110, receiving an application as unicast content, is receiving the application at a level of signal quality and/or service quality that is greater than a signal threshold and/or a service threshold, respectively. Based on the determination that the group of user devices 110 is receiving the application at the signal and/or service levels that are greater than the signal and/or service thresholds, content gateway 140 may generate resource schedule information that causes base station 120 to provision the application, as multicast content. The resource schedule information may associate one or more carrier frequencies and/or a quantity of bandwidth, a data rate, a quantity of subframes and/or time slots, and/or a MCS index to the application that allows base station 120 to provision the application as the multicast content.

Content gateway 140 may generate resource scheduling information that causes base station 120 to provision a particular application and/or service that user device 110 has previously accessed. Content gateway 140 may determine that user device 110 has previously accessed the particular application and service based on previous service information obtained from user device 110 and/or information associated with a usage history associated with user device 110. Content gateway 140 may assign a bandwidth resources (e.g., a quantity of bandwidth, a quantity of resource blocks, one or more frequency bands, etc.), time resources (e.g., period of time, a quantity of subframes, etc.), and/or a MCS index, to the particular application, which may enable base station 120 to provision the particular application and/or service when user device 110 requests to access the particular application and/or service.

Content gateway 140 may generate resource schedule information that causes base station 120 to provision an application using a particular frequency band. Content gateway 140 may generate the resource schedule information, which may cause base station 120 to provision the application, when service information, associated with another base station 120, indicates that a level of signal quality, received by other user devices 110 while accessing the application via the other base station 120, is less than a signal threshold. Provisioning the application and/or service, by base station 120, using the particular frequency band, may allow the other user devices 110 to access the application and/or service at a signal strength (e.g., a signal power level, RSRP level, RSSI, SINR, etc.) that is greater than the signal threshold.

Content gateway 140 may generate other resource scheduling information, in a manner described above, for other base stations 120. The other resource scheduling information may be generated from other traffic load information (e.g., obtained from other base stations 120) and/or other service information (e.g., obtained from other user devices 110 being served by the other base stations).

As still further shown in FIG. 7, process 700 may include transmitting, to each base station associated with the RAN, the resource schedule information (block 525). For example, content gateway 140 may store respective resource schedule information, for each base station 120, in a different data structure (e.g., data structure 600 of FIG. 6). Content gateway 140 may transmit respective resource schedule information, to each base station 120 associated with the RAN. The respective resource schedule information may be used, by each base station 120, to provision applications and/or services to respective groups of user devices 110 that are serviced by each of base stations 120. Provisioning the applications and/or services using the respective resource schedule information, may enable base stations 120 to avoid becoming congested. Provisioning the applications and/or services, using the respective resource schedule information, may enable the groups of user devices 110 to access the applications and/or services at a level of service quality and/or signal quality that is greater than the service threshold and/or signal threshold.

Content gateway 140 may also transmit all or a portion of the resource scheduling information to user devices 110 that allows user devices 110 to identify frequency bands, data rates, MCS indices, a manner in which an application and/or service is to be accessed (e.g., as unicast traffic, multicast traffic, etc.) etc. to be used to access the application and/or services via base stations 120.

Systems and/or methods, described herein, may enable a network to obtain service information from user devices being served by base stations within a RAN. The systems and/or methods may use the service information to identify user devices that are receiving a level of service quality that is less than a threshold and/or a level of signal quality that is less than another threshold.

The systems and/or methods may enable traffic conditions, within the RAN, to be identified. Information associated with the traffic conditions may identify applications and/or services that are being provided by the RAN, whether congestion is present within the RAN, and/or resources being used to provision the applications and/or services, etc. The systems and/or methods may use the service information and/or the traffic load information to generate resource schedule information which identifies a manner in which the network resources have been allocated and/or are to be used, by the RAN, to provision the applications and/or services to the user devices. The systems and/or methods may use the resource schedule information to perform load balancing, within the RAN, by allocating network resources (e.g., carrier bands, available bandwidth, data rates, subframes and/or time slots, MCS indices, base station processing capacity, etc.), in a manner that reduces and/or eliminates congestion within the RAN. The systems and/or methods may use the resource schedule information to allocate the network resources to ensure that the user devices receive a level of service quality and/or signal quality for which the user devices have subscribed.

The foregoing description provides illustration and description, but is not intended to be exhaustive or to limit the implementations to the precise form disclosed. Modifications and variations are possible in light of the above disclosure or may be acquired from practice of the embodiments.

While series of blocks have been described with regard to FIGS. 5 and 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
 receiving, by a device and from one or more user devices, service information that identifies one or more applications that are being accessed by the one or more user devices and one or more levels of service quality, received by the one or more user devices, when accessing the one or more applications;
 identifying, by the device and based on the service information, that a user device is accessing an application, of the one or more identified applications, at a level of service quality, of the one or more levels of service quality, that is less than a threshold;
 assigning, by the device, one or more quantities of bandwidth to the one or more applications based on the service information; and
 transmitting, by the device and to a base station, scheduling information that identifies how the one or more quantities of bandwidth are assigned to the one or more applications,
  where transmitting the scheduling information allows the base station to use a quantity of bandwidth, of the one or more quantities of bandwidth, that is assigned to the application to provide the application accessed by the user device at a level of service quality that is not less than the threshold.

2. The method of claim 1, where the level of service quality corresponds to a period of time when the application is available to be used by the user device relative to a second period of time.

3. The method of claim 1, where assigning the one or more quantities of bandwidth to the one or more applications further includes:
assigning one or more different frequency bands to each of the one or more applications based on the service information, where assigning the one or more different frequency bands allows the base station to provide each of the one or more applications, to the user device, using the one or more different frequency bands.

4. The method of claim 1, further comprising:
identifying, based on the service information, that another user device, of the one or more user devices, is accessing another application, of the one or more applications, at a level of signal quality that is less than another threshold;
assigning one or more frequency bands to the other application based on the identification that the other user device is accessing the other application at the level of signal quality that is less than the other threshold; and
transmitting, to the base station, information that indicates that the one or more frequency bands have been assigned to the other application, where transmitting the information allows the base station to use the one or more frequency bands to provide the other application, to the other user device, at a level of signal quality that is not less than the other threshold.

5. The method of claim 1, further comprising:
obtaining, from the base station, traffic information that identifies a respective quantity of user devices, of the one or more user devices, that are accessing each of the one or more of the applications;
determining, based on the traffic information, that a quantity of user devices that are accessing another application, of the one or more applications, is greater than another threshold; and
assigning, a first quantity of frequency bands to the other application based on the determination that the quantity of user devices that are accessing the other application, is greater than the other threshold, where the first quantity of frequency bands is greater than a second quantity of frequency bands that were previously used, by the base station, to provide the other application to the quantity of user devices.

6. The method of claim 1, further comprising:
obtaining, from the base station, traffic information, where the traffic information indicates that a portion of the one or more user devices, are accessing another application, of the one or more applications, as unicast content;
determining whether a quantity of user devices, associated with the portion of the one or more user devices, is greater than another threshold;
assigning a first quantity of subframes to the other application, where the first quantity of subframes causes the base station to provide the other application as the unicast content when the quantity of user devices is not greater than the other threshold; and
assigning a second quantity of subframes to the other application, where the second quantity of subframes causes the base station to provide the other application as multicast content when the quantity of user devices is greater than the other threshold, where the second quantity of bandwidth is greater than the first quantity of bandwidth.

7. The method of claim 1, where the service information includes at least two of:
information associated with the one or more applications,
information associated with the one or more user devices,
information associated with one or more frequency bands, quantities of bandwidth, or data rates, being used by the one or more user devices, to access the one or more applications,
information associated with quantities of subframes, or modulation and coding schemes (MCSs), being used by the one or more user devices, to access the one or more applications,
information associated with the one or more levels of service quality, received by the one or more user devices, when accessing the one or more applications, or
information associated with levels of signal quality, received by the one or more user devices, when accessing the one or more applications.

8. The method of claim 1, further comprising:
determining, based on the service information, whether a portion of the one or more user devices are receiving a multicast service associated with another level of service quality, of the one or more levels of service quality, that is less than a first threshold or a level of signal quality that is less than a second threshold; and
instructing the base station to provide the multicast service, to the portion of the one or more user devices and as a unicast service, when the portion of the one or more user devices are receiving the multicast service at the other level of service quality that is less than the first threshold or when the level of signal quality that is less than the second threshold.

9. A network device, comprising:
one or more processors to:
obtain service information from one or more user devices, where the service information identifies one or more first frequency bands that are used, by the one or more user devices, to access one or more services and respective levels of signal quality, received by each of the one or more user devices, while accessing the one or more services,
determine, based on the service information, that a portion of the one or more user devices, is accessing a service, of the one or more services, at first levels of signal quality that are less than a threshold,
assign one or more second frequency bands to the one or more services based on the determination that the portion of the one or more user devices is accessing the service at the first levels of signal quality that are less than the threshold, and
transmit, to a base station, information associated with assigning the one or more second frequency bands to the one or more services,
where transmitting the information, associated with assigning the one or more second frequency bands, allows the base station to provide the service, to the portion of the user devices at second levels of signal quality that are not less than the threshold.

10. The network device of claim 9, where one of the first levels of signal quality correspond to at least one of:
a power level, reference signal received power (RSRP) level, or relative signal strength indication (RSSI) associated with a signal that is being received by a user device, of the one or more user devices,
a signal-to-interference noise ratio (SINR) associated with the signal being received by the user device, or a measure of channel isolation associated with the signal being received by the user device.

11. The network device of claim 9, where the one or more processors are further to:
   determine, based on the service information, that a user device, of the one or more user devices, is accessing a particular service, of the one or more services, at a first level of service quality that is less than a service threshold, and
   assign a quantity of bandwidth or a quantity of subframes, to the particular service that enables the user device to access the particular service at a second level of service quality that is not less than the service threshold,
      where the quantity of bandwidth or the quantity of subframes is greater than another quantity of bandwidth or another quantity of subframes, respectively, being used by the user device to access the particular service at the first level of service quality that is less than the service threshold.

12. The network device of claim 9, where the service is being accessed, by the portion of the one or more user devices, as a multicast service, and
   where the one or more processors are further to:
      determine, based on the service information, that another portion of the one or more user devices is accessing the service as a unicast service at a level of signal quality that is greater than a threshold, and
      instruct the base station to provide the service to the other portion of the one or more user devices, using one or more further frequency bands and as the multicast service, based on the determination that the other portion of the one or more user devices is accessing the service at the level of signal quality that is greater than the threshold.

13. The network device of claim 12, where the one or more other frequency bands correspond to a frequency band associated with a long term evolution (LTE) network, and
   where the or the one or more further frequency bands correspond to a frequency band that is different than the frequency band associated with the LTE network.

14. The network device of claim 9, where the one or more processors are further to:
   obtain, from the base station, traffic information that identifies traffic load conditions associated with the base station,
   determine, based on the traffic information, that the base station is providing a particular service, of the one or more services, to a set of user devices, of the one or more user devices, using a third frequency band, of the one or more frequency bands,
   identify that a quantity of the set of user devices, is greater than a capacity associated with the third frequency band, and
   assign at least a fourth frequency band, of the one or more frequency bands, to the particular service, based on the identification that the quantity of the set of user devices is greater than the capacity associated with the third frequency band.

15. The network device of claim 14, where a first quantity of bandwidth, associated with the third frequency band is less than a second quantity of bandwidth associated with the third frequency band and at least the fourth frequency band assigned to the other service.

16. The network device of claim 9, where the one more processors are further to:
   obtain, from another base station, traffic information that identifies traffic load conditions associated with the other base station,
   identify that the other base station is congested based on the traffic information that identifies the traffic load conditions associated with the other base station,
   reassign one or more other services, from the other base station, to the base station based on the identification that the other base station is congested; and
   transmit, to the base station, information that identifies that the one or more other services has been reassigned from the other base station to the base station.

17. A non-transitory computer-readable medium containing one or more instructions executable by one or more processors, the computer-readable medium comprising:
   one or more instructions to receive, from a base station associated with a radio access network (RAN), service information that identifies a measure of signal quality or service quality associated with one or more applications that are accessed by one or more user devices via the base station;
   one or more instructions to assign one or more different frequency bands to the one or more applications based on the service information; and
   one or more instructions to transmit, to the base station, resource information that identifies how the one or more different frequency bands are assigned to the one or more applications,
      where the resource information allows the base station to use the one or more different frequency bands to provision the one or more applications and to permit the one or more user devices to access the one or more applications, and
      where the one or more different frequency bands allow the one or more user devices to access the one or more applications with a measure of signal quality that is greater than a first threshold or a measure of service quality that is greater than a second threshold.

18. The computer-readable medium of claim 17, further comprising:
   one or more instructions to retrieve prior service information associated with the one or more user devices;
   one or more instructions to identify that a portion of the one or more user devices previously accessed an application, of the one or more applications, at a level of service quality that is less than the second threshold; and
   one or more instructions to assign a first modulation and coding scheme to the application,
      where the first modulation and coding scheme (MCS) is different than a second MCS that was previously used, by the portion of the one or more user devices, to access the application, and
      where the first MCS allows the portion of the one or more user devices to access the application at another level of service quality that is not less than the second threshold.

19. The computer-readable medium of claim 17, further comprising:
   one or more instructions to retrieve prior service information associated with the one or more user devices;
   one or more instructions to identify that a portion of the one or more user devices previously accessed an application, of the one or more applications, at a level of signal quality that is less than the first threshold; and one or more instructions to assign a first quantity of frequency bands to the application,
  where the first quantity of frequency bands is greater than a second quantity of frequency bands that was previously used, by the portion of the user devices, to access the application, and
  where the first quantity of frequency bands allows the portion of the user devices to access the application at a level of signal quality that is not less than the first threshold.

20. The computer-readable medium of claim 17, further comprising:
  one or more instructions to obtain traffic information from the base station, where the traffic information identifies traffic load conditions associated with the base station;
  one or more instructions to determine, based on the traffic information, that a portion of the one or more user devices that accessed a multicast application, of the one or more applications, via a first frequency band, has caused the base station to become congested; and
  one or more instructions to assign the first frequency band and a second frequency band to the multicast application based on the determination that the portion of the one or more user devices that accessed a multicast application, via the first frequency band, caused the base station to become congested.

21. The computer-readable medium of claim 17, further comprising:
  one or more instructions to determine, based on the service information, that a portion of the one or more user devices, that are accessing an application, of the one or more applications, as a multicast application, is less than a threshold; and
  one or more instructions to instruct the base station to transmit the application, as a unicast application, based on the determination that the quantity of the one or more user devices is less than the threshold.

22. The computer-readable medium of claim 17, further comprising:
  one or more instructions to transmit, to one of the one or more user devices, the resource information, where the resource information allows the one of the one or more user devices to access the one or more applications using the one or more different frequency bands.

* * * * *